United States Patent
Moir et al.

(10) Patent No.: US 11,997,168 B2
(45) Date of Patent: May 28, 2024

(54) CONNECTING DEVICES FOR COMMUNICATION SESSIONS

(71) Applicant: AGvisorPRO, Inc., Calgary (CA)

(72) Inventors: Brock Moir, Edmonton (CA); Wilson Schultz, Wetaskiwin (CA)

(73) Assignee: AGVISORPRO, INC. (CA)

( * ) Notice: Subject to any disclaimer, the term of this patent is extended or adjusted under 35 U.S.C. 154(b) by 253 days.

(21) Appl. No.: 17/703,311

(22) Filed: Mar. 24, 2022

(65) Prior Publication Data

US 2022/0311828 A1 Sep. 29, 2022

Related U.S. Application Data

(60) Provisional application No. 63/166,479, filed on Mar. 26, 2021.

(51) Int. Cl.
| | |
|---|---|
| H04L 67/141 | (2022.01) |
| G06F 16/2457 | (2019.01) |
| G06F 40/166 | (2020.01) |
| G06F 40/205 | (2020.01) |
| G06F 40/40 | (2020.01) |

(52) U.S. Cl.
CPC ...... *H04L 67/141* (2013.01); *G06F 16/24578* (2019.01); *G06F 40/166* (2020.01); *G06F 40/205* (2020.01); *G06F 40/40* (2020.01)

(58) Field of Classification Search
CPC .. G06F 16/24578; G06F 40/166; G06F 40/40; G06F 40/205

USPC .......................................................... 709/223
See application file for complete search history.

(56) References Cited

U.S. PATENT DOCUMENTS

| | | |
|---|---|---|
| 10,453,454 B2 | 10/2019 | Homma et al. |
| 2018/0231391 A1 | 8/2018 | Yang et al. |
| 2019/0065991 A1* | 2/2019 | Guggilla ................ G06N 20/00 |
| 2020/0372088 A1* | 11/2020 | Liu ..................... G06F 16/9532 |

OTHER PUBLICATIONS

International Preliminary Report on Patentability on PCT application PCT/IB2002/052724 dated Oct. 5, 2023.
Foreign Search Report on PCT PCT/IB2022/052724 dated Jun. 27, 2022.

* cited by examiner

*Primary Examiner* — Sibte H Bukhari
(74) *Attorney, Agent, or Firm* — Foley & Lardner LLP

(57) ABSTRACT

Connecting devices for communication sessions is provided. A system can receive, from a client device, a first query comprising text. The system can determine, responsive to the first query and via a machine learning model, confidence scores corresponding to the expert identifiers. The system selects a first subset of expert identifiers based on a threshold confidence score or a ranking technique. The system transmits a second query based on the first query to client devices corresponding to the first subset of expert identifiers. The system identifies, based on responses to the second query, a second subset of expert identifiers. The system provides, to the client device, an indication of the second subset of expert identifiers to cause the client device to establish a communication session with at least one client device of at least one of the second subset of expert identifiers.

18 Claims, 8 Drawing Sheets

CONNECTING DEVICES FOR COMMUNICATION SESSIONS

CROSS-REFERENCES TO RELATED APPLICATIONS

This application claims the benefit of priority under 35 U.S.C. § 119 to U.S. Provisional Patent Application No. 63/166,479, filed Mar. 26, 2021, which is hereby incorporated by reference herein in its entirety.

BACKGROUND

Users of client devices can communicate with one-another using communication sessions. However, as the number of users and client devices increase, and the specifications of the users become more granular, it is challenging to accurately and reliably connect client devices for a communication session in an efficient manner.

SUMMARY

One technical solution is directed to systems and methods for connecting devices for communication sessions. This technical solution can provide a prediction method that is accurate and explainable, while also ensuring that the client devices are online and configured to establish a communication session, thereby increasing the accuracy and reliability of the connection while preventing connection failure.

At least one aspect of this technical solution is directed to a system to connect devices for communication session. The system can include a data processing system comprising memory and one or more processors. The data processing system can receive, from a client device via a network, a first query comprising text. The data processing system can determine, responsive to the first query, a plurality of confidence scores corresponding to the plurality of expert identifiers. The data processing system can determine the plurality of confidence scores via a machine learning model. The machine learning model can be trained with a plurality of expert records associated with a plurality of expert identifiers and labeled with a plurality of categories. The data processing system can select a first subset of expert identifiers from the plurality of expert identifiers based on a threshold confidence score or a ranking technique. The data processing system can transmit a second query based on the first query to a plurality of client devices corresponding to the first subset of expert identifiers. The plurality of client devices can be different from the client device. The data processing system can identify, based on one or more responses to the second query from one or more of the plurality of client devices, a second subset of expert identifiers from the first subset of expert identifiers. The data processing system can provide, to the client device, an indication of the second subset of expert identifiers to cause the client device to establish a communication session with at least one client device of at least one of the second subset of expert identifiers.

At least one aspect of this technical solution is directed to a method to connect devices for communication session. The method can be performed by a data processing system comprising memory and one or more processors. The method can include the data processing system receiving, from a client device via a network, a first query comprising text. The method can include the data processing system determining, responsive to the first query and via a model, a plurality of confidence scores corresponding to the plurality of expert identifiers. The model can be constructed based on a plurality of expert records associated with a plurality of expert identifiers and labeled with a plurality of categories. The method can include the data processing system selecting a first subset of expert identifiers from the plurality of expert identifiers based on a threshold confidence score or a ranking technique. The method can include the data processing system transmitting a second query based on the first query to a plurality of client devices corresponding to the first subset of expert identifiers. The plurality of client devices can be different from the client device. The method can include the data processing system identifying, based on one or more responses to the second query from one or more of the plurality of client devices, a second subset of expert identifiers from the first subset of expert identifiers. The method can include the data processing system providing, to the client device, an indication of the second subset of expert identifiers to cause the client device to establish a communication session with at least one client device of at least one of the second subset of expert identifiers.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
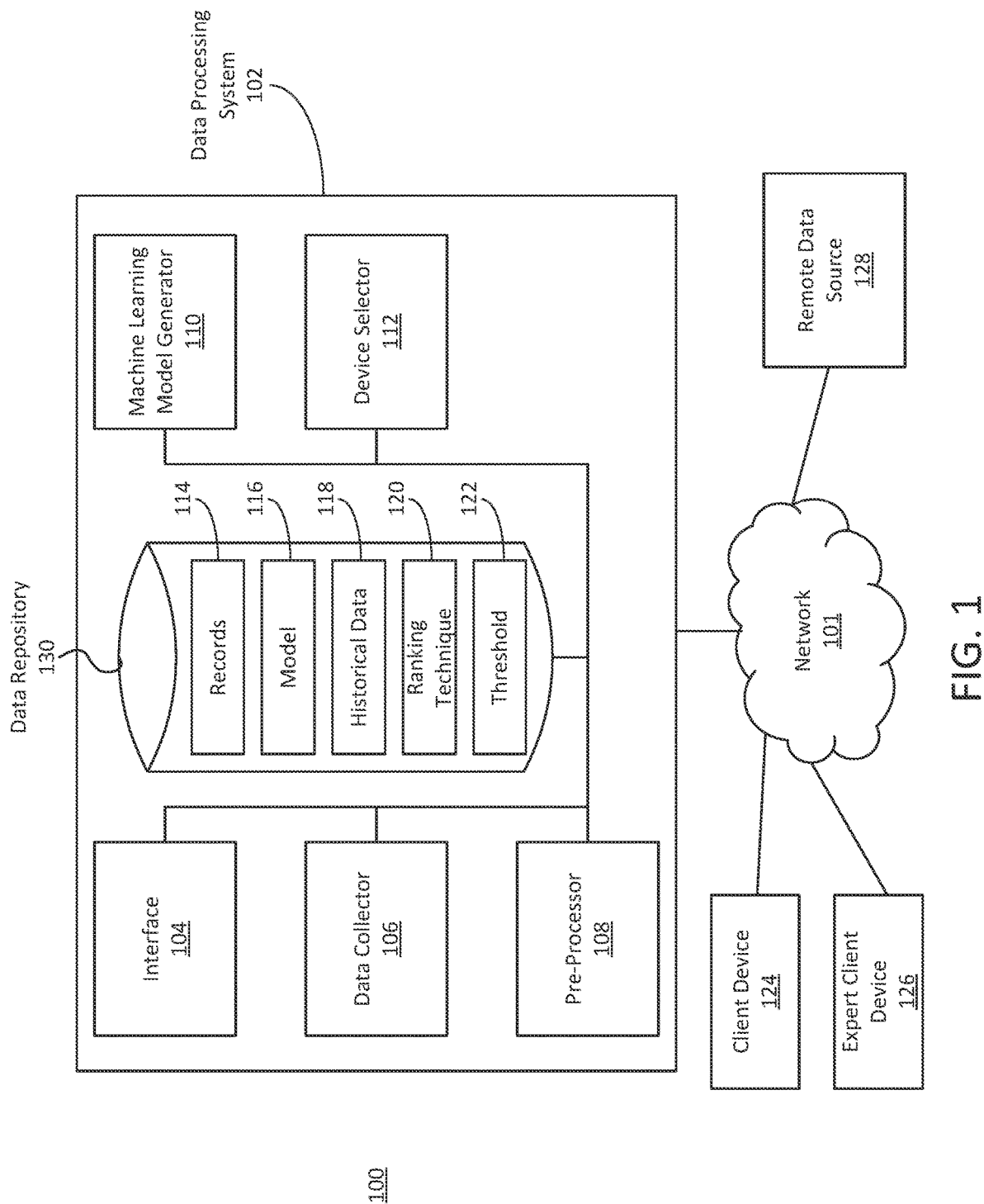
FIG. 1 is an illustration of an example system to connect devices for communication sessions.

Following below are more detailed descriptions of various concepts related to, and implementations of, methods, apparatuses, and systems of connecting devices for communication sessions. The various concepts introduced above and discussed in greater detail below may be implemented in any of numerous ways.

One technical solution is generally directed to systems and methods for connecting devices for communication sessions. This technical solution can provide a prediction method that is accurate and explainable, while also ensuring that the client devices are online and configured to establish a communication session, thereby increasing the accuracy and reliability of the connection while preventing connection failure.

For example, a system can receive a query from a client device of a user. The query can relate to an issue, such as an agricultural issue or other issue in a particular field, industry or vertical. The system can identify an expert with which to connect the user in order to establish a communication session and respond to the query. The system can use a prediction technique in order to identify the expert. However, certain prediction techniques may be accurate, such as a machine learning based model, but operate like a black box in which it is challenging to explain how an expert is identified. Whereas other prediction may facilitate explaining how the expert was identified, such as a keyword based search, but may be less accurate at identifying a relevant or qualified expert. For example, keyword searches may be less accurate due to the particular jargon or slang in the query provided by the user, which may be a farmer or other user in a particular industry, field, or vertical, such as agriculture, automotive, restaurant services, retail, clothing, landscaping, etc. Furthermore, it may be challenging to define or maintain keyword categories or a hierarchy due to the different slang or jargon used by different users in different geographic locations or in different sectors of the field.

Thus, systems and methods of this technical solution can provide a prediction method that is accurate, explainable, and ensures that the identified expert is available to respond to the query from the user and establish a communication session with the user. To do so, this technology can receive a query from a client device. The query can include text, video, images, or audio. The technology can process the input query, which can cleaning the query or transforming the query. For example, the technology can process the input query using natural language process in order to remove certain terms, jargon or slang that is not relevant to the identifying an expert, or translating aspects of the query to facilitate identifying the expert. In some cases, the query can include classification information. The technology can input the query into a machine learning-based model in order to identify matching expert records. The technology can automatically query the matching experts in order to receive confirmation from the matching experts as to whether they can answer or address the query. The technology can then present a list of matching experts that affirmatively indicated they can address the query. Thus, this technology solution can use a machine learning model in order to accurately identify experts responsive to the query, while providing explainable results based on the expert affirmatively indicating that they can address the input query. The technology can also ensure that the expert is available by prompting the expert to respond.

The technical solution can train the machine learning model using training data scraped or obtained from online resources. For example, the technology can access multiple industry-related online forums to obtain data. The technology can use natural language processing to process the data. The technology can establish categories associated with the data, and associate the categories with expert identifiers or expert records. For example, an agriculture category can relate to a query such as "Why do I have black spots on wheat?". This query or corresponding category can be labeled with a unique identifier of one or more experts that can address this query. The machine learning model can be trained based on these queries or corresponding categories labeled with corresponding expert identifiers or expert records. By training the machine learning model with categories or keywords and corresponding expert identifiers, this technical solution an input a new query from a user into the model and output one or more expert identifiers that match the input query and a confidence score associated with the match. The technology can select one or more of the output expert identifiers based on the corresponding confidence score output from the model.

By providing an indication of an expert identifier with the highest confidence score or a confidence score above a threshold that also affirmatively responds to a prompt, this technology can reduce computational resources, remote procedures calls, or excessive network bandwidth usage by reducing the number of experts the user may attempt to connect with prior to reaching an expert that is available and capable of addressing the query.

In some cases, the data processing system can match the query to one or more expert identifiers using a classification model. The classification model can be generated based on input, such as historical input from one or more users. The data processing system can use the user input to classify the query and match the expert identifier. The data processing system can generate training data from the user input, and train the machine learning model using the training data.

FIG. 1 illustrates an example system 100 to connect devices for communication sessions. The system 100 can include a data processing system 102. The data processing system 102 can communicate with one or more of a client device 124, expert client device 126, or remote data source 128 via a network 101. The network 101 can include computer networks such as the Internet, local, wide, metro, or other area networks, intranets, satellite networks, and other communication networks such as voice or data mobile telephone networks. The network 101 can be used to access information resources such as web pages, web sites, streaming media resources, domain names, or uniform resource locators that can be provided, output, rendered, or displayed on at least one client device 124 or expert client device 126, such as a desktop computer, laptop computer, tablet computer, smart phone, mobile telecommunication device, or portable computers. The client device 124 or expert client device 126 can include one or more component depicted in FIG. 8.

The network 101 can be used by the data processing system 102 to access information resources such as data objects stored in the remote data source 128, web pages, web sites, domain names, or uniform resource locators that can be provided, output, rendered, or displayed by the client device 124 or expert client device 126. For example, via the network 101 a user of the client device 124 can provide a query to the data processing system 102, and receive an indication of expert identifiers from the data processing system 102 responsive to the query.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 101, for example with the client device 124, expert client device 126 or remote data source 128. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device. For example, the remote data source 128 can be maintained, administered or otherwise managed by a third-party entity that is different from the entity that maintains, administers or otherwise manages the data processing system 102. An entity can refer to company, organization, or individual. A third-party entity can refer to an entity that is different from the entity that administers the data processing system 102.

The data processing system 102 can interface with, communicate with or otherwise access one or more remote data sources 128. The remote data source 128 can include at least one logic device such as a computing device having a processor to communicate via the network 101, for example with the client device 124, expert client device 126 or the data processing system 102. The remote data source 128 can include one or more servers. The remote data source 128 can include one or more databases. The remote data source 128 can be housed in a data center or one or more data centers.

The remote data source 128 can include or refer to one or more online forums, electronic forums or digital forums. The remote data sources 128 can include websites, online documents, blogs, articles, or other data sources. The remote data sources 128 can include social media or social networking websites. The remote data sources 128 can include forums related to a particular field, industry or vertical, such as agriculture, automotive, retail, clothing, landscaping, etc. The forums can include or be a repository of information related to the field, industry or vertical, such as agricultural information. Users, via client devices 124 or 126, can access the remote data source 128 to obtain information about topics related to the field. For example, users can access the remote data source 128 to obtain information about agricultural topics, such as challenging growing crops, how to effectively or efficiently grow crops, how to increase yields, how to maintain agricultural equipment, information about the growing season, fertilizer, or other agriculture-related issues. The online forms can include information about these topics. The online forms can include information about experts that can address issues related to the topics, such as expert farmers or other experts on agricultural topics.

The data processing system 102 can include, interface, or otherwise communicate with at least one interface 104. The data processing system 102 can include, interface, or otherwise communicate with at least one data collector 106 (or data collector component). The data processing system 102 can include, interface, or otherwise communicate with at least one pre-processor 108 (or pre-processor component). The data processing system 102 can include, interface, or otherwise communicate with at least one machine learning model generator 110 (or machine learning model generator component). The data processing system 102 can include, interface, or otherwise communicate with at least one device selector 112 (or device selector component). The data processing system 102 can include, interface, or otherwise communicate with at least one data repository 130.

The interface 104, data collector 106, pre-processor 108, machine learning model generator 110, and device selector 112 can each include at least one processing unit or other logic device such as programmable logic array engine, or module configured to communicate with the database repository 130 or database. The interface 104, data collector 106, pre-processor 108, machine learning model generator 110, and device selector 112 can be separate components, a single component, or part of the data processing system 102. The system 100 and its components, such as a data processing system 102, can include hardware elements, such as one or more processors, logic devices, or circuits.

The data repository 130 can include one or more local or distributed databases, and can include a database management system. The data repository 130 can include computer data storage or memory and can store one or more of records 114, models 116, historical data 118, ranking techniques 120, or thresholds 122, among other information that can facilitate connecting client devices with expert client devices.

For example, the data repository 130 can include one or more records 114. Records 114, or records data structure, can refer to expert records or expert profiles. Expert profiles can refer to expert client devices 126. An expert can refer to an entity that can address a query from a user client device 124. An expert can refer to an entity that is knowledgeable about a topic in a particular field and that can provide help or support to someone in that field. For example, an expert can refer to an entity that is knowledgeable about an agricultural topic that can provide help or support to a farmer, such as a user of the client device 124. The record 114 for a particular expert can include a unique identifier (e.g., alphanumeric, numeric, username, etc.) that identifies the expert record. The expert record can include information about the expert, such as a client device identifier, contact info, keywords, feedback, geographic location information, or other information.

The data repository 130 can include one or more models 116. The model 116 can include or refer to a classification model constructed from user input or historical data. The model 116 can refer to or include a machine learning model or a model 116 trained using a machine learning technique. For example, the data processing system 102 can include a machine learning model generator 110 that trains or generates the model 116 using a machine learning technique whose input is historical data 118 or other training data corresponding to industry or vertical-related topics (e.g., agricultural topics), keywords, categories and corresponding labels for expert identifiers. The data processing system 102 can use the model 116 to identify expert identifiers and corresponding confidence scores that indicate a level of match to an input query.

The data repository 130 can include historical data 118. Historical data 118 can refer to or include training data, such as data scraped or obtained from remote data sources 128. The historical data 118 can include industry-related topics, keywords, or categories.

The training data can be generated from historical user input. For example, a client device 124 can make a remote procedure call to the data processing system 102. The remote procedure call can include input, a request, or a query. The query from the client device 124 to the data processing system 102 can include or be associated with, for example, text, an image, video, or audio. The data processing system 102 can provide a prompt to the client device 130 for additional information. The data processing system 102 can provide the prompt to the client device 130 responsive to receiving the query. The prompt for additional information can include a request for categorical information, classification information, keyword information, topic information, or other contextual information of the query that can facilitate generating a model (e.g., a classification model or machine learning model) to select one or more expert client devices 126 that can response to the query from the client device 130. The data processing system 102 can associate the input query information and additional contextual (or categorical or classification) information with feedback from one or more expert client devices 126. For example, the data processing system 102 can forward or provide the query to one or more expert client device 126. The expert client devices 126 can provide feedback or a response to the data processing system 102 that is responsive to or based on the input query. For example, the expert client device 126 can process the query and provide feedback to the data processing system 102. The feedback to the data processing system 102 can indicate relevance information, a confidence score, or a capability of the expert client device 126. For example, the feedback information received by the data processing system 102 from the expert client device 126 can indicate a match or relevance of the expert client device 126 to the query received from the client device 124. The feedback information can include a relevance score or grade, or response to the query. For a single query from the client device 124, the data processing system 102 can receive the feedback information or responses from multiple expert devices 126. The data processing system 102 can generate training data from the feedback information, as well as the input query and associated contextual information of the query.

The data repository 130 can include a ranking technique 120. Ranking techniques 120 can include score based ranking technique, such as selecting the expert identifiers with the highest confidence scores. Ranking techniques 120 can include time-based ranking, such as select expert identifiers that respond to a prompt from the data processing system 102 in the least amount of time. The data repository 130 can include thresholds 122. Thresholds 122 can refer to a threshold confidence score used by the data processing system 102 to filter out expert identifiers prior to sending a prompt.

The data processing system 102 can include an interface 104 (or interface component) designed, configured, constructed, or operational to communicate with a client device 124, expert client device 126, and a remote data source 128 via network 101. The interface 104 can receive data objects from a remote data source 128. The interface 104 can receive and transmit information using one or more protocols, such as a network protocol. The interface 104 can include a hardware interface, software interface, wired interface, or wireless interface. The interface 104 can facilitate communication between one or more components of the data processing system 102.

The interface 104 can include or provide a user interface, such as a graphical user interface or frontend user interface. The interface 104 can provide the user interface or access to a frontend interface via client device 124. The interface 104 can receive input from a client device 124, such as input queries or requests. The interface 104 can provide output for presentation via the client device 124 or expert client device 126, such as digital output, visual output, or audio output.

The data processing system 102 can include a data collector 106 designed, constructed, and operational to access or obtain information from one or more remote data sources 128. The data collector 106 can, via the interface 104, access the remote data source 128 to obtain industry or vertical-related information (e.g., agricultural information). The data collector 106 can identify keywords, topics, or other information. The data collector 106 can be configured with (e.g., include, store, or access from data repository 130) a list of addresses, uniform resource locators, or other references. The data collector 106 can access online resources using the list of addresses to scrape, crawl, or otherwise obtain information from the online resources. The data collector 106 can navigate to any online data source that is remote from and different form the data processing system 102. The data collector 106 can collect questions from prior interactions with one or more client devices 124, one or more expert client devices 126, or remote data sources 128.

In some cases, the data collector 106 can be configured with account information, authentication information, or other credentials that allow the data collector 106 to access the remote data source 128. For example, the data collector 106 can be configured with (or maintain in a file or memory or data repository 130) a username and password, security token or digital certificate that allow the data collector to access information stored on the remote data source 128.

The data collector 106 can receive information from the remote data source 128 in any format. The data collector 106 can receive data objects, data records or data entries. The data objects can include one or more fields. The data objects can include or be referred to as data records or data fields. The data objects or records can be in any format, such as a hypertext markup language ("HTML"), comma-separated values (e.g., .CSV), an open extensible markup language ("XML") spreadsheet (e.g., XLSX), or a portable document format file (e.g., .PDF). The data objects can include fields and corresponding data entries or values with information about the agricultural topics or experts.

The data processing system 102 can include a pre-processor 108 designed, constructed and operational to parse or process the information obtained by the data collector 106. The pre-processor 108 can parse or process the information using any technique, including, for example, natural language processing ("NLP"). The pre-processor 108 can use natural language to process to remove certain terms that may be irrelevant or cause confusion. For example, information posted on an online forum can include slang or jargon that may cause errors or reduce the accuracy of results or matches. Thus, the pre-processor 108 can use NLP to filter out or translate the terms in order to generate an improved training data set.

The pre-processor 108 can include or access (e.g., from the data repository 130) a list of terms that may be predetermined to be irrelevant, introduce technical problems, or otherwise introduce delays, latency or errors into one or more components or functions of the data processing system 102. The irrelevant terms may cause the machine learning model generator 110 to perform excessive computations or processors. The irrelevant terms may reduce the accuracy of the model 116 generated by the model generator 110. The irrelevant terms may cause downstream processing by the data processing system 102 that does not facilitate selecting an expert client device 126 that is responsive to an input query from the client device 124. The irrelevant terms, if included in training data, can degrade the performance of the model 116 or data processing system 102.

The pre-processor 108 can process the input query to remove the irrelevant terms. In some cases, the pre-processor 108 can reduce the weight given to the irrelevant terms, thereby reducing the impact of the irrelevant terms has on the model 116, the model generator 110, or device selector 112. Removing the irrelevant terms can refer to or include deleting the irrelevant terms, constructing a new input query without the irrelevant terms, flagging the irrelevant terms to instruct a component of the data processing system 102 to not use the irrelevant terms, or otherwise reducing or preventing an impact of the irrelevant terms or use of the irrelevant terms in a downstream process of the data processing system 102.

The data processing system 102 can include a machine learning model generator 110 designed, constructed, and operational to train a machine learning model 116. The machine learning model generator 110 can generate or train a model using a machine learning technique. The machine learning model generator 110 can use any type of machine learning technique, including, for example, supervised learning, unsupervised learning, or reinforcement learning. The machine learning model generator 110 can use functions such as linear regression, logistic regression, a decision tree, support vector machine, Naïve Bayes, k-nearest neighbor, k-means, random forest, dimensionality reduction function, or gradient boosting functions.

The machine learning model generator 110 can use a training data set to train the model 116. Training data can include the historical data 118. Training data can include industry-related keywords or categories, such as agriculture-related keywords or categories. The training data can be labeled with expert identifiers or expert records. Thus, the training data can include an agriculture or other industry category and a corresponding one or more expert identifiers. The industry-related category can include one or more topics, metadata, keywords, historical queries, or any other information. For example, the training data can include an agriculture category with one or more agriculture queries and a corresponding one or more expert identifiers corresponding to expert records 114 of experts that can answer or address to the one or more agriculture queries. The one or more agriculture queries can be historical queries previously received by the data processing system 102. The one or more agriculture queries can be queries scraped or obtained from a remote data source 128. In some cases, the machine learning model generator 110 can train the model with expert records associated with expert identifiers and labeled with agricultural categories.

In an illustrative example, the data processing system 102 can collect questions from prior interactions with one or more client devices 124 or posted on one or more remote data sources 128. The data processing system 102 can select a subset of questions relevant to one or more segments of experts associated with expert identifiers. The data processing system 102 can send the selected experts the questions to verify which experts can or cannot assist with the question. The data processing system 102 can use the responses from the experts indicating whether they can or cannot assist with the question to train the machine learning model 116. The responses from the expert client devices 126 can include a binary responsive (e.g., yes or no, 0 or 1), a score on a scale (e.g., a score from 1-10 that indicates how confident the expert is with the query, where 1 can indicate lowest confidence level and 10 can indicate highest confidence level, or vice versa), a grade, or a response. For example, the feedback from the experts can be used to label queries associated with the questions, and used to train the machine learning model 116. The data processing system 102 can then use the trained machine learning model 116 to predict, for a new query, whether a particular expert can or cannot answer the query.

In some cases, the response feedback from the expert client device 126 can include a response to the query, such as an actual answer to the query. The data processing system 102 can process the answer received from the expert client device and compare the answer with a predetermined or known answer stored in the data repository 130. The predetermined or known answer may be ground truth or known to be true or correct answer (e.g., based on a validation from a known expert client device 126, an administrator of the data processing system 102, or crowd sourced correct answer based on a majority—or other statistically significant number—of expert client devices 126 providing a certain answer). The data processing system 102 can compare the answer from the expert client device 126 with a correct answer to grade the answer given by the expert client device 126 to determine whether the expert client device 126 has correctly answered the query. The data processing system 102 can generate feedback that indicates whether the response from the expert client device 126 was correct or incorrect, or a degree of correctness. The data processing system 102 can use the feedback as part of the training data, along with the input query and context information received from the client device 124, to train a classification model or a machine learning model.

The data processing system 102 can include a device selector 112 designed, constructed and operational to identify one or more expert client devices 126 responsive to an input query from a user client device 124. For example, the data processing system 102 can receive a query from a client device 124. The query can be referred to as a first query. The first query can include text, audio, video, or an image. The data processing system 102 can pre-processor 108 the first query to clean the first query using NLP. For example, the first query can include jargon or slang that can reduce the accuracy of the model trained by the machine learning model generator 110. Thus, the pre-processor 108 can clean or translate the first query to improve the accuracy and reliability of the device selector 112 using the model trained by the machine learning model generator 110. The data processing system 102 can apply a natural language processing technique to the first query received from the client device to remove one or more terms from the first query to increase at least one of the confidence scores output by the machine learning model 116.

If the first query includes audio, the pre-processor 108 can convert the audio to text using speech recognition techniques. If the first query includes an image, the pre-processor 108 can generate keywords for the image using an image recognition technique. In some cases, the pre-processor 108 can compare the image with patterns or other image to identify a similar or matching predetermined image. The pattern or predetermined image can be associated with keywords or other values that can be input into the model 116. If the first query includes video, the pre-processor 108 can similar compare images or frames of the video to generate keywords.

The device selector 112, upon receiving the first query, can determine, via the machine learning model 116, confidence scores corresponding to expert identifiers. The confidence score can indicate a level of match between the first query and the expert identifier. The confidence score can indicate a likelihood that the expert identifier can answer or address the first query. For example, the higher the confidence score, the more likely the expert identifier can address or answer the first query. The confidence score can be numerical and range from 0 to 1, 0 to 10, 0 to 100 or have some other range. The confidence score can be a probability of match between the expert identifier and the first query.

The device selector 112 can identify a first subset of expert identifiers based on a threshold score or a ranking technique. The first subset of expert identifiers can be different from or not include the identifier of the client device 124. The first subset of expert identifiers can refer to a subset of the full set of expert identifiers included in the model 116 based on the training data. The full set of expert identifiers can refer to all expert records 114 used to label the training data. Thus, the device selector 112, by inputting the first query into the model, can output the first subset of expert identifiers. The first subset of expert identifiers can be less than the full set of expert identifiers used to train the model 116. The first subset of expert identifiers can correspond to expert identifiers having confidence scores output by the model 116 that are above a threshold 122 (e.g., 0.5, 0.6, 0.7, or other threshold). In some cases, the first subset of expert identifiers can correspond to expert identifiers having confidence scores output by the model 116 that are the highest ranking confidence scores (e.g., top 10 highest confidence scores, top 20 highest confidence scores, top 50 highest confidence scores, or other predetermined number of highest ranking confidence scores).

The device selector 112, upon identifying the first subset of expert identifiers, can generate and transmit a second query to each expert client device 126 associated with the first subset of expert identifiers. The second query can be based on the first query received from the client device 124. The second query can be the same as the first query, or a translated, transformed or cleaned version. The second query can be a prompt generated based on the first query. The second query can include a call to action, such as a request for a response. For example, the second query can be "Can you answer the following query: <first query>?" The second query can include an indication or call to action to respond, such as "If you can respond to the following query: <first query>, please respond within <time interval>". The time interval can be 5 minutes, 10 minutes, 15 minutes, 30 minutes, 1 hour, 2 hours, 3 hours, 6 hours, or other time interval. The time interval can be predetermined or set by the data processing system 102, or can be provided by the client device 124 providing the first query.

The device selector 112 can receive responses to the second query from one or more expert client devices 126 associated with the first subset of expert identifiers. In some cases, none of the expert client devices 126 may respond, in which case the data processing system 102 can automatically add additional expert identifiers to the first subset of expert identifiers and transmit the second query to the additional expert identifiers. In some cases, if none of the expert client devices 126 respond within a time interval, the data processing system 102 can re-transmit the second query or otherwise ping or prompt the expert client devices 126 to respond.

Upon receiving responses to the second query from the expert client devices 126, the device selector 112 can identify a second subset of expert identifiers. The second subset of expert identifiers can be a subset of the first subset of expert identifiers. The second subset of expert identifiers can include some or all of the expert identifier sin the first subset of expert identifiers. The second subset of expert identifiers can correspond to experts that responded to the second query in the affirmative by indicating that they can address, help with, or otherwise answer the first query input by the client device 124.

The device selector 112 can identify the second subset of expert identifiers based on a ranking or threshold. For example, the device selector 112 can identify the second subset of expert identifiers as the expert identifiers having the highest confidence scores (e.g., top 10 highest confidence scores) of the first subset of expert identifiers that also responded to the second query within a predetermined time interval. The device selector 112 can identify the second subset of expert identifiers as the expert identifiers that responded to the second query in the least amount of time (e.g., top 10 fastest responses). The device selector 112 can identify the second subset of expert identifiers based on a combination of highest confidence scores and fastest response times, or a function based on confidence score and response time.

The device selector 112 can determine a number of experts to include in the second subset of expert identifiers based on a threshold 122, or an indication from the client device 124. For example, the device selector 112 can receive, from the client device 124, an indication of a maximum number of expert identifiers. The device selector 112 can select, based on the ranking technique, the first subset or the second subset of expert identifiers comprising a number of expert identifiers that is less than or equal to the maximum number of expert identifiers.

The device selector 112 can provide an indication of the second subset of expert identifiers to the client device 124. The client device 124, responsive to receiving the second subset of expert identifiers, can initiate a communication session with one or more expert client devices 126 associated with the second subset of expert identifiers. For example, the client device 124 can establish an audio communication or video communication. The communication session can be a real-time communication or an asynchronous communication session. For example, a real-time communication session can include an audio call or teleconference, or a video-based call or video conference. An asynchronous communication can include a text-based chat, text messaging, or other electronic message. In some cases, the client device 124 can establish one or more communication sessions with one or more modes of communication with a particular expert client device 126. For example, the client device 124 may have an initial communication session that is text-based or asynchronous. Subsequent to the initial communication session, the client device 124 can establish a real-time communication session with the expert client device 126, such as an audio call or a video call.

The data processing system 102 can set a time limit for responding to the second query. The data processing system can identify the second subset of expert identifiers from the first subset of expert identifiers based on responses received from the second subset of expert identifiers satisfying the time limit.

Based on the time limit, the data processing system can determine not to connect to a third subset of expert identifiers based on responses to the second query from the third subset of expert identifiers being received upon expiration of the time limit. For example, if the an expert identifier did not respond to the second query within the time limit, the data processing system 102 can exclude or not include the expert identifier in the second subset of expert identifiers.

The data processing system 102 can determine a response time for each of the one or more responses to the second query, and select a predetermined number of shortest response times based on the response time for each of the one or more responses. The data processing system 102 can identify the second subset of expert identifiers corresponding to the predetermined number of shortest response times.

After the client device 124 establishes the communication session with an expert client device 126, the data processing system can receive an indication that the communication session ended, completed, or otherwise terminated. The data processing system 102 can receive, subsequent to the termination, feedback from the client device 124 indicative of a performance of the communication session. The feedback can include a score, rating, or binary value indicative of the performance by the expert. For example, the feedback can indicate that the expert was able to answer or address the first query, or not able to answer or address the first query. The data processing system 102 can update the machine learning model 116 based on the feedback to improve a performance of the machine learning model 116. For example, the data processing system 102 can remove the expert identifier label from the category associated with the first query used to the train the model 116, and then update the model 116. The data processing system 102 can cause the model 116 to reduce a confidence score for the expert identifier when a subsequent query is received in the same category as the first query.

Figure 2:
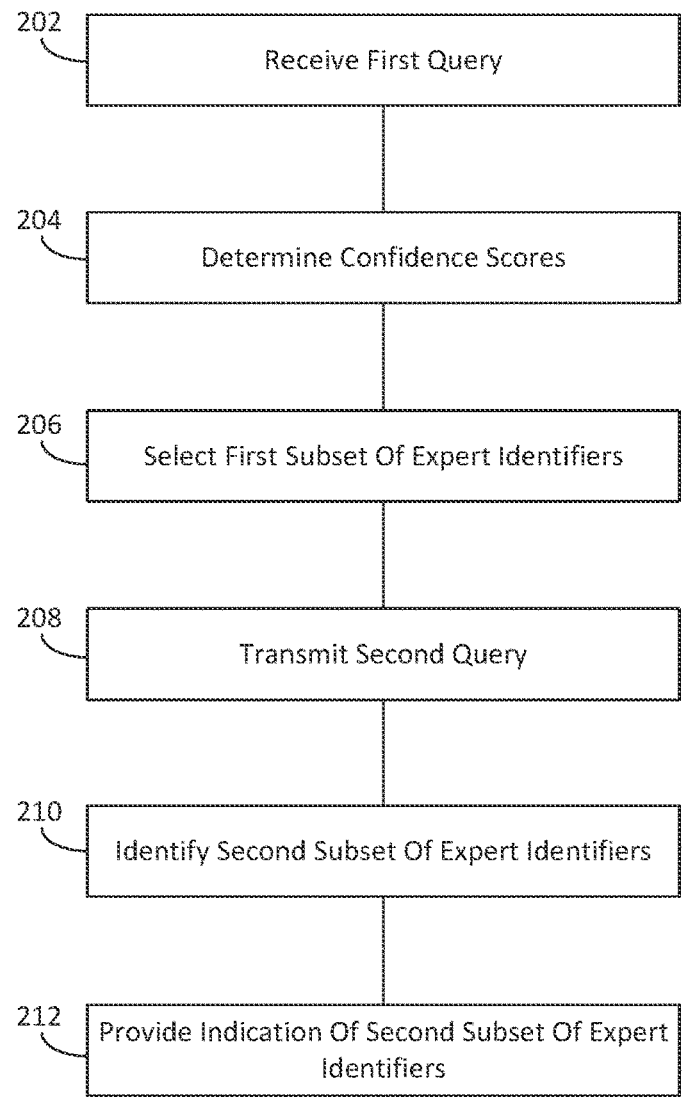
FIG. 2 is an illustration of an example method for connecting devices for communication sessions.

FIG. 2 is an illustration of an example of an operational flow for connecting devices for communication sessions, in accordance with an implementation. The method 200 can be performed by one or more system or component depicted in FIG. 1 or FIG. 8, including, for example, a data processing system, data collector, pre-processor, machine learning model generator, or device connector. At ACT 202, the data processing system can receive a first query. The data processing system can receive the first query from a client device. The first query can include text, images, video, or audio. The first query can be a question or issue related to an agriculture field. The data processing system can pre-process the first query using NLP to clean or transform the first query to improve the performance of a machine learning model. The data processing system can use one or more techniques to filter, clean, or otherwise remove irrelevant terms in the first query that can negatively impact the performance of the data processing system.

The data processing system can provide a prompt to the client device for additional information associated with the first query. The data processing system can prompt the user to input, via the client device, a category for the first query, classification of the first query, keywords, topics or other information associated with the first query.

At ACT 204, the data processing system can determine confidence scores. The data processing system can use a model to determine the confidence scores. The data processing system can use a classification model to determine the confidence scores. For example, the first query can include or be associated with contextual information or classification information. The data processing system can use a model trained via machine learning to determine the confidence scores. The model can be constructed based on expert records associated with expert identifiers and labeled with categories. The labels can correspond to the additional contextual information provided by the client device responsive to the prompt from the data processing system. The data processing system can input the first query into a machine learning model to generate output that includes a confidence score for each expert identifier. The confidence score can indicate a level of match between the first query and the expert identifier, which can indicate a likelihood or probability that the expert identifier can address or answer the first query.

The data processing system can use various types of training data to train the model using machine learning. The data processing system can generate the training data or collect the training data. The data processing system can use historical data associated with input from client devices or expert devices as the training data or to generate the training data. The data processing system can use previous performance information to generate the training data, such as information about how expert client devices performed on queries input by client devices. The data processing system can use feedback information from the expert client devices or the client devices. For example, the client device can indicate whether the response or answer from the expert client device was satisfactory, correct, helpful, useful, or whether the response otherwise was responsive to or addressed the query. The feedback information from the client device can be used as part of the training data as it can indicate whether the expert is qualified or capable of answering such queries.

At ACT 206, the data processing system can select a first subset of expert identifiers. The data processing system can use the confidence scores to select the first subset of expert identifiers. The data processing system can select the highest ranking expert identifiers. The data processing system can select the expert identifiers with the highest confidence scores. The data processing system can select all expert identifiers with a confidence score above a threshold confidence score.

At ACT 208, the data processing system can transmit a second query. The data processing system can transmit the second query to each expert client device associated with an expert identifier in the second subset of expert identifiers. The second query can be the first query or be generated based on the first query. The second query can include a prompt or request to respond if the expert is available and capable to address to the second query.

At ACT 210, the data processing system can generate a second subset of expert identifiers based on the responses to the second query. The second subset of expert identifiers can include all experts that responded to the second query. The second subset of expert identifiers can include experts that responded to the second query within a predetermined amount of time. The second subset of expert identifiers can include the highest ranking expert identifiers that also responded within a predetermined amount of time.

At ACT 212, the data processing system can provide an indication of the second set of expert identifiers to the client device that provided the first query. The client device can connect with one or more of the expert client devices associated with the second subset of expert identifiers. The client device can use the data processing system to connect with the expert client device. The client device can use contact info provided with the indication of the second subset of expert identifiers to connect with the expert client device using a different communication medium, such as an audio call, video call, or chat session.

Figure 3:
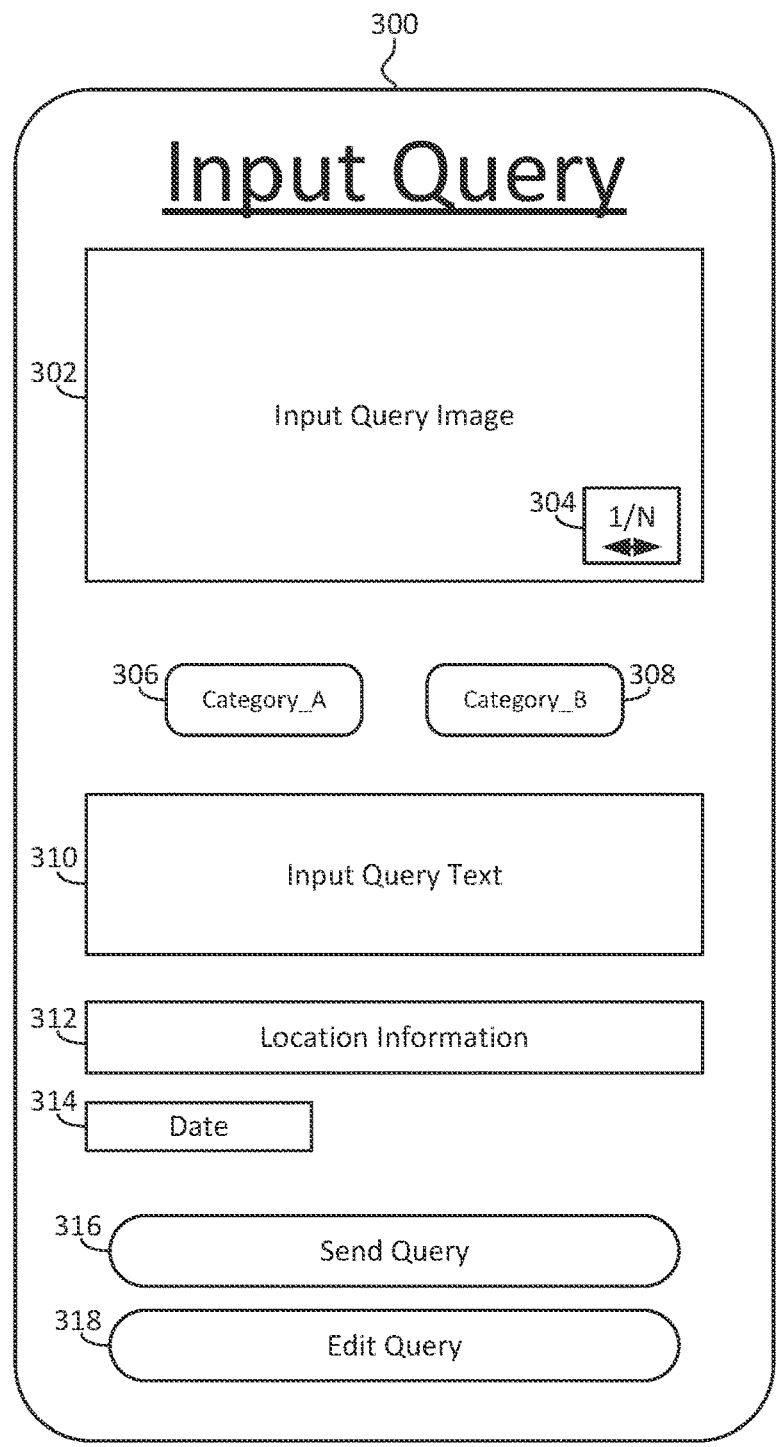
FIG. 3 is an illustration of a graphical user interface for inputting a query.

FIG. 3 is an illustration of a graphical user interface ("GUI") for inputting a query. The GUI 300 can be provided by one or more component or system depicted in FIG. 1, including, for example, client device 124 or data processing system 102. For example, the GUI 300 can be presented for display via a display device 835 coupled to the client device 124. The client device 124 can be in communication with the data processing system 102 through the network 101. The GUI 300 can be provided, rendered or executed by an application executing on the client device 124. The application can include a native application, a mobile application, a network application, or a Software-as-a-Service application. The application can include or be a web browser application. The application can be a mobile application downloaded from an application store or marketplace, for example. The application store or marketplace can be provided by a manufacturer of the client device 124 or operating system executing on the client device 124. The application can be developed by an administrator, entity, or organization associated with the data processing system 102. The application can be delivered or provided via the data processing system 102, for example.

The GUI 300 rendered, presented or otherwise provided by the application executing on the client device 124 can include one or more user interface elements to input a query. The input query can include text, images, video, or audio. For example, GUI 300 can include an input query text user interface element 310 through which a user can provide text input. The GUI 300 can include an input query image user interface element 310 through which the user can input an image, or other type of file, such as video or audio. The GUI 300 can receive multiple images via the user interface element 304. the user can cycle through multiple images via user interface element 304. The user can upload multiple images for the input query. Thus, via GUI 300, the client device 124 can provide an input query text to the data processing system 102 and can attach one or more images or other types of files to the input query for transmission to the data processing system 102.

The client device 124 can select a category of the input query. The client device 124 can use one or more user interface elements 306 or 308 to select the category for the query. The user interface elements 306 and 308 can include drop down menus, lists, input text boxes, or other types of user interface elements that allow the user of the client device 124 to select, indicate, input or otherwise provide one or more categories or classifications for the input query. Example categories can include sprayers, crop protection, agronomy, mental health, animal health, feed, farm real-estate, insurance, succession planning, or mechanical assistance with equipment.

In some cases, the data processing system 102 can receive the query text 310 or query image 302, perform natural language processing on the query, and provide a suggestion for the category or classification. In some cases, the data processing system 102 can automatically select the category or classification based on the query text.

The GUI 300 can indicate location information 312. The location information 312 correspond to a location of the client device 124. The location information 312 can correspond to a location of a farm or other property or business of the user of the client device 124. The location information 312 can correspond to location information provided in a profile of the user. In some cases, the client device 124 can include a location sensor, such as a global positioning system sensor, that can be used to determine the location information 312. In some cases, the user can input the location information 312. The location information 312 can include or indicate, for example, one or more of a country, country, state, province, city, town, street address, or latitude and longitude coordinates.

The GUI 300 can indicate the current date 314. The GUI 300 can indicate a current time in addition to or along with the date 314. The date/time 314 can correspond to the date/time at which the query is being input by the user into the client device 124.

The GUI 300 can include a send query button 316. Upon reviewing the query, the user can select the send query button 316 to transmit the query to the data processing system 102. The client device 124 can transmit the query to the data processing system 102 via network 101. To transmit the query to the data processing system 102, the client device 124 can generate one or more data packets or data files that include the information input or provided via GUI 300. For example, a data file can include one or more of the query image 302, category_A 306, category_B 308, query text 310, location information 312, or date 314.

The GUI 300 can include an edit query 318 button. For example, the GUI 300 can represent a screen in the user interface flow in which the user reviews the information uploaded through one or more previous screens or GUIs. During the review process, the user can determine to edit one or more field or value (e.g., the input query image or input query text), and select the edit query 318 button to execute the edit. In some cases, the user can input via GUI 300 an expiration duration for the query. The expiration duration can refer to or include an amount of time for which the query remains active and expert client devices 126 can provide responses.

Figure 4:
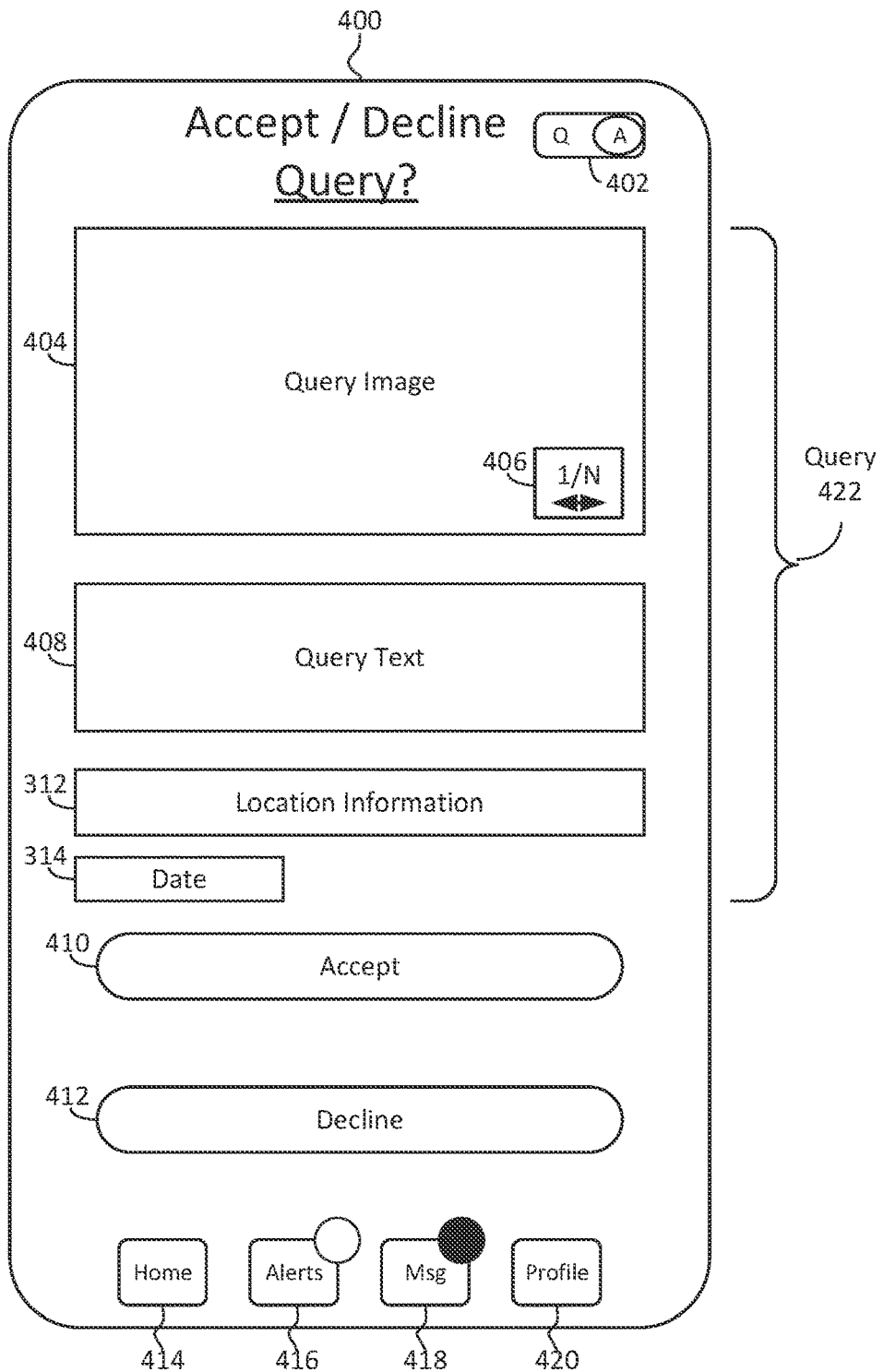
FIG. 4 is an illustration of a graphical user interface for accepting or declining the query.

FIG. 4 is an illustration of a graphical user interface for accepting or declining the query. The GUI 400 can be provided by one or more component or system depicted in FIG. 1, including, for example, expert client device 126 or data processing system 102. For example, the GUI 400 can be presented for display via expert client device 126 in communication with the data processing system 102 through the network 101. The GUI 400 can be provided, rendered or executed by an application executing on the expert client device 126. The application can include a native application, a mobile application, a network application, or a Software-as-a-Service application. The application can include or be a web browser application. The application can be a mobile application downloaded from an application store or marketplace, for example. The application store or marketplace can be provided by a manufacturer of the expert client device 126 or operating system executing on the expert client device 126. The application can be developed by an administrator, entity, or organization associated with the data processing system 102. The application can be delivered or provided via the data processing system 102, for example. In some cases, the application executing on the expert client device 126 can be a version of the application executing on the client device 124. In some cases, the same application can execute on both the client device 124 and the expert client device 126. For example, the same application can provide GUI 300 and GUI 400. The application can enter a client mode (e.g., help mode) or query mode to provide the GUI 300 depicted in FIG. 3, the GUI 600 depicted in FIG. 6, or the GUI 700 depicted in FIG. 7. The application can enter an expert mode or answer mode or response mode to provide the GUI 400 depicted in FIG. 4 or the GUI 500 depicted in FIG. 5.

The GUI 400 can be an expert card which can show the questions in the categories that are relevant to the expert. For example, a question sent to the crop protection category may only go to crop protection experts. The question card (e.g., GUI 400) can include photos and a location. If the expert selects the decline button 412, the card can disappear or hide or close. If the expert selects the accept button 410, the expert can be prompted to send a response. The response can initiate or start a conversation or communication session with the question asker.

Through GUI 400, the expert user of the expert client device 126 can determine whether to accept or decline the query input by the client device 124 via GUI 300. The expert can determine whether or not to accept the query. Accepting the query can refer to, include, or entail inputting or providing a response to the query. Declining the query can refer to or include removing the query from the expert client device GUI 400 or queue. The query can be declined by selection of the decline button 412. In some cases, the query can expire after a timer or countdown period, such as 1 hour, 2 hours, 6 hours, 12 hours, 24 hours, or other time period.

The GUI 400 can include a toggle 402 between a query view and an answer view. In the answer view, which is depicted in GUI 400, the expert client device 126 can present queries input by other client devices 124 and determine whether to accept or decline the query. The query view can correspond to GUI 300 with which a client device 124 can input a query.

The GUI 400 can include a query image 404. The query image 404 can correspond to the image provided via the input query image 302 user interface element of GUI 300 depicted in FIG. 3. The query image 404 can be the same image, or can be processed or re-formatted by the data processing system 102 before being provided to the expert client device 126 for presentation via GUI 400. For example, the data processing system 102 can reduce the file size or resolution of the image, crop portions of the image, zoom in on the image, or otherwise modify or adjust the image received via GUI 300 before providing the query image 404 for presentation via GUI 400.

The GUI 400 can include query text 408. The query text 408 can correspond to the text provided via the input query text 310 user interface element of GUI 300 depicted in FIG. 3. The query text 408 can be the same text, or can be processed, revised, filtered or edited by the data processing system 102 before being provided to the expert client device 126 for presentation via GUI 400. The GUI 400 can indicate location information 312 corresponding to the location information 312 depicted in GUI 300. The GUI 400 can indicate date 314 corresponding to the date 314 depicted in GUI 300.

The data processing system 102 can construct the query 422 based on the input from GUI 300. The query 422 constructed by the data processing system 102 can include the query image 404, query text 408, location information 312, and date 314.

The GUI 400 can include an accept button 410. Selecting the accept button 410 can allow for providing a response to the query 422. A user of the expert client device 126 can select, trigger, activate, or otherwise interact with the accept button 410 via an input device 830. The GUI 400 can include a decline button 412. The user of the expert client device 126 can select, trigger, activate, or otherwise interact with the decline button 412 via an input device 830. The user can decline the query by taking no action and allowing the query 422 to expire.

The GUI 400 can include one or more buttons 414, 416, 418 or 420 to navigate from one GUI 400 to another GUI or screen or to change the contents of the GUI 400. For example, selection of a home icon 414 can navigate to a home screen. The home screen can provide a dashboard or overview GUI.

The GUI 400 can include an alerts icon 416. Alerts can refer to any type of alert or notification. Selecting the alerts icon 416 can navigate to a screen with queries that have been submitted by client devices 124. The alerts icon 416 can provide an indication when there are new queries. The data processing system 102 can provide a notification, command, instructions or other indication to the expert client device 126 that causes the alerts icon 416 to indicate whether there are any new queries that the user of the expert client device 126 can accept to provide a response for. New queries can refer to client devices 124 inputting a new query, such as via GUI 300 depicted in FIG. 3.

The data processing system 102 (e.g., via device selector 112) can determine to provide an alert or notification of a new query to an expert client device 126. The data processing system 102 can determine to provide the alert or notification of a new input query to the expert client device 126 based on a category, classification or other attribute or characteristic of the input query. The data processing system 102 can determine to provide the input query to the expert client device 126 based on the category, classification or other attribute or characteristic of the input query matching, being similar to, or otherwise mapping or corresponding to a profile of the expert client device 126 or expert or user thereof. For example, the data processing system 102 can determine to provide a notification of the queries 422 that have a category or classification that matches or corresponds to a category or classification of the profile of the expert. The data processing system 102 can determine to provide a notification of the queries 422 based on location information 312 matching location information in the profile of the expert client device 126 or expert thereof.

The data processing system 102 (e.g., via device selector 112) can filter out queries 422 that do not match or correspond to the profile 420 of the expert client device 126. The data processing system 102 can block or prevent transmission of alerts 416 or notifications of queries 422 that do not match or correspond to profile information of the expert client device 126. In some cases, the profile of the expert can include an instruction to block queries 422 based on a category, classification, or other attribute or characteristic of the query 422. For example, the profile can indicate to block alerts 416 for queries related to agricultural equipment. The expert can include the instructions for which categories to allow or block. In some cases, the data processing system 102 can use feedback or a model 116 to determine which queries 422 to forward to the expert client device 126, and which queries to block or prevent from being transmitted to the expert client device 126. By providing input queries 422 to expert client devices 126 with matching or relevant profiles, the data processing system 102 can reduce excessive or wasted network communications, remote procedure calls, expert client device battery usage, or other computing or resource consumption. By providing input queries 422 to expert client devices 126 with matching or relevant profiles, the data processing system 102 can improve the accuracy or relevancy of responses or answers to the queries. By providing input queries 422 to expert client devices 126 with matching or relevant profiles, the data processing system 102 can reduce the amount of processing done by the data processing system 102 or client device 124 in processing the responses. By providing input queries 422 to expert client devices 126 with matching or relevant profiles, the data processing system 102 can improve the ability of the machine learning model generator 110 to generate a model 116 to be used in selection by the device selector 112.

The GUI 400 can include a messages icon 418. The messages icon 418 can cause the application to navigate to a messages screen or GUI in which the GUI can present electronic messages that have been sent to the expert client device 126. The GUI 400 can include a profile icon 420 via which the expert can create, view, update, edit or otherwise interact with the profile.

Figure 5:
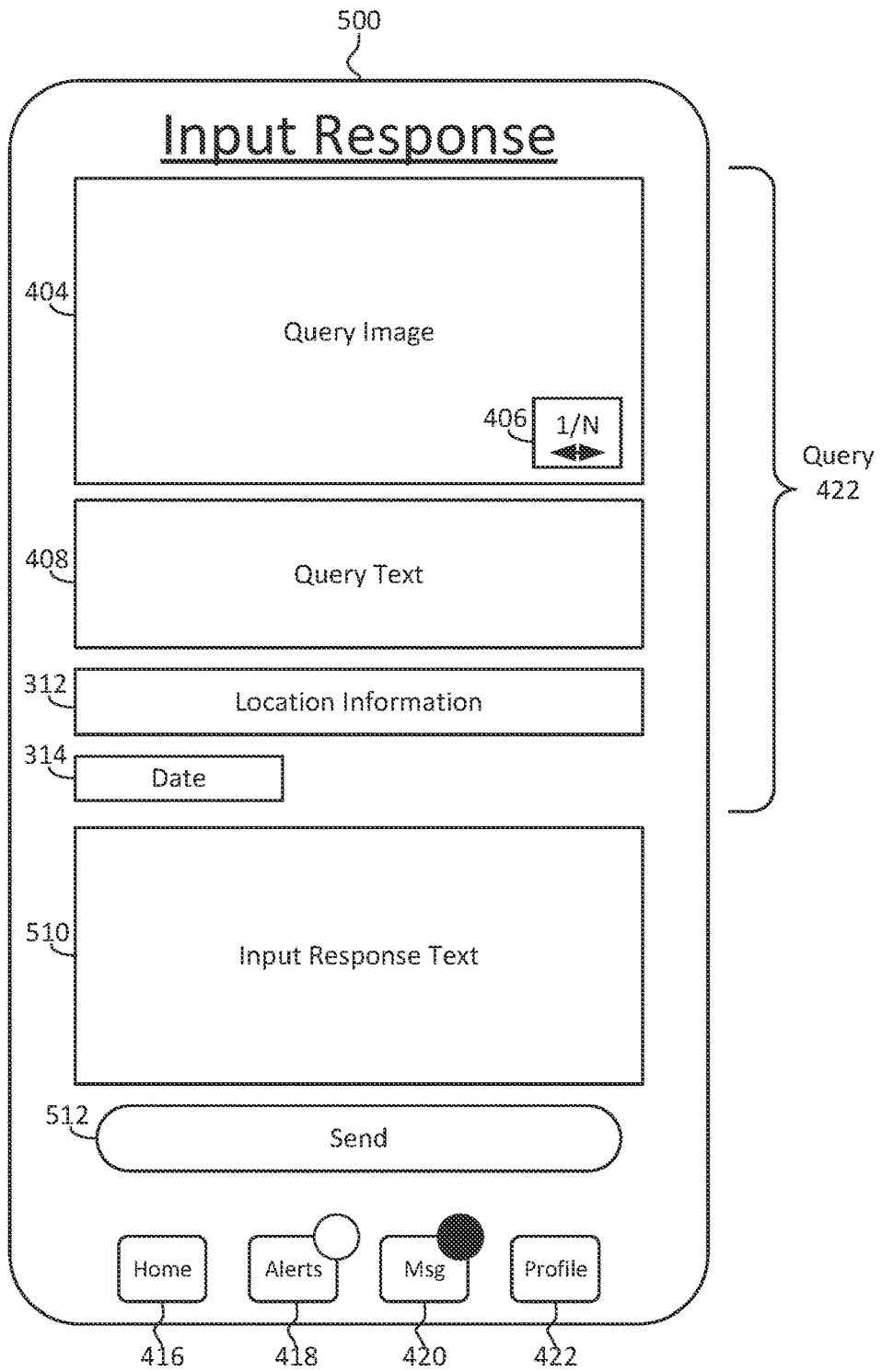
FIG. 5 is an illustration of a graphical user interface for responding to the query.

FIG. 5 is an illustration of a graphical user interface for responding to the query. The GUI 500 can be provided by one or more component or system depicted in FIG. 1, including, for example, expert client device 126 or data processing system 102. For example, the GUI 500 can be presented for display via expert client device 126 in communication with the data processing system 102 through the network 101. The GUI 500 can provide one or more user interface elements to facilitate inputting a response. The response can be to the query 422 input by the client device 124. The GUI 500 can present the query 422, including, for example, the query image 404, interactive UI element 406 to cycle through multiple images, query text 408, and the date 314 the query was input by the client device 124.

Upon accepting to answer the query via GUI 400, the application can present the GUI 500 with an input response text box 510. The user of the expert client device 126 can input text in box 510 via an input device 830. Responsive to accepting the query by selecting the accept button 410 in GUI 400, the expert can input a response text 510, which can include a response or answer to the query 422. Upon entering the response, the expert can select the send button 512 to send the response to the data processing system 102 via network 101. The expert client device 126, response to selection of the send button 512, can convert the input text to data packets or a data file for transmission to the data processing system 102 via network 101. The GUI 500 can include one or more of the home icon 414, alerts icon 416, messages icon 418, or profile icon 420.

Figure 6:
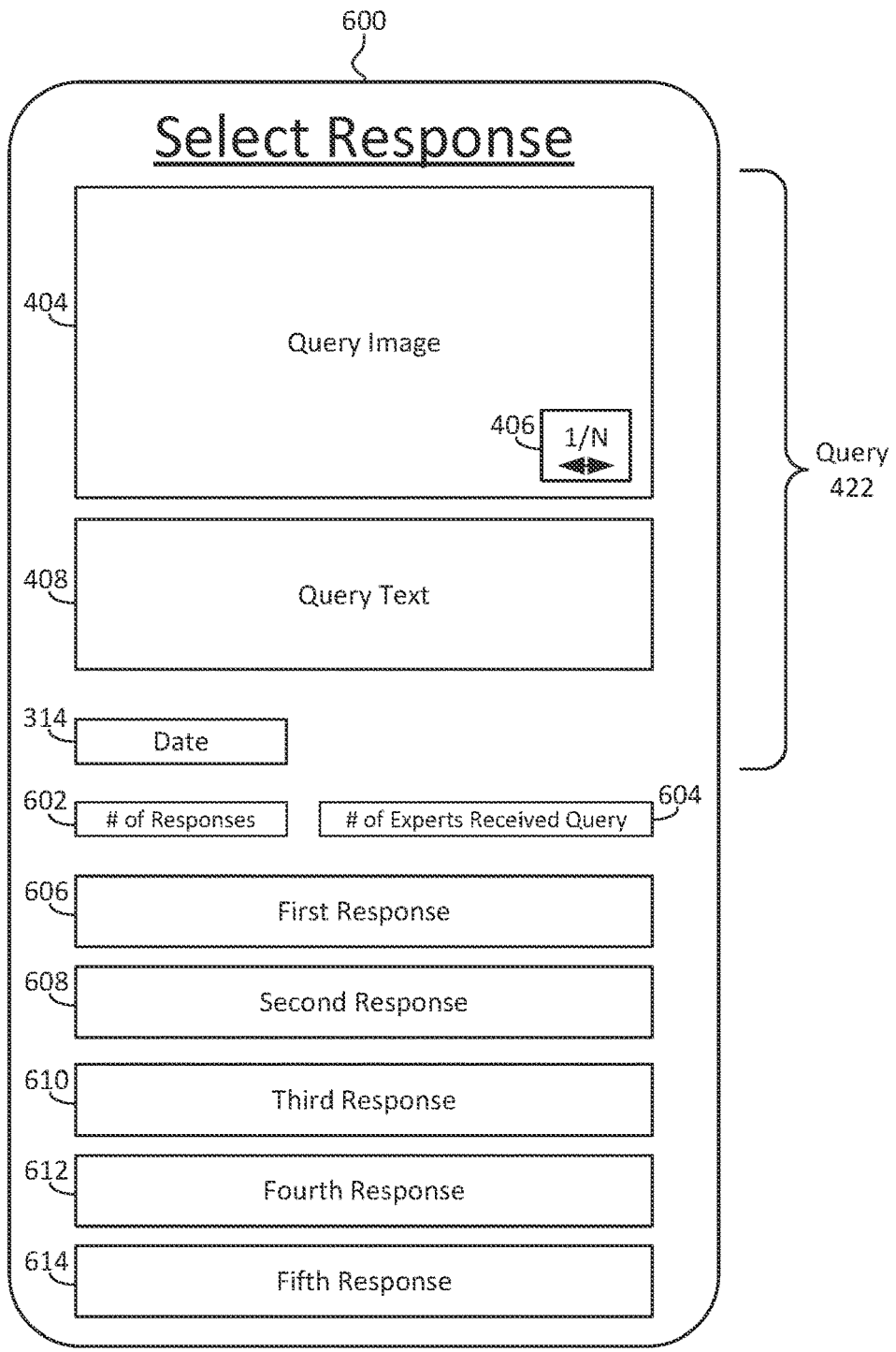
FIG. 6 is an illustration of a graphical user interface for selecting a response to the query.

FIG. 6 is an illustration of a graphical user interface for selecting a response to the query. The GUI 600 can be provided by one or more component or system depicted in FIG. 1, including, for example, client device 124 or data processing system 102. For example, the GUI 600 can be presented for display via client device 124 in communication with the data processing system 102 through the network 101. The GUI 600 can present the query 422, including the query image 404, query text 408, UI element 406, or date 314, for example. The data processing system 102 can receive responses to the input query 422 from one or more expert client devices 126 via GUI 500. For example, one, two, three, four, five, ten, 20, 30 or any other number of expert client devices 126 can execute instances of an application that provides a GUI 500 through which a respective expert can input a response to the query 422.

The GUI 600 can present, for responses 606-614, an indication of the expert identifier that provided the response (e.g., name, username of the expert). The GUI 600 can present, for responses 606-614, an indication of the response itself, or a portion of the response that can be displayed in the GUI. The GUI 600 can present, for responses 606-614, an indication of the date or time the response was submitted by the expert or received by the data processing system 102.

The data processing system 102 can provide the responses from the expert client devices 126 that accepted the query via the accept button 410 and then input responses via the input response text 510 and selected the send button 512. The data processing system 102 can count or tally the number responses and provide the number of responses 602 (e.g., 5 responses). The data processing system 102 can tally the number of experts that received the query via GUI 400 and provide an indication 604 of the number of experts that received the query. The data processing system 102 can determine the number of experts whose profile matched the query (e.g., category 306 or 308) and provide indication 604 of this number of experts. In some cases, the number of experts 604 that received the query can correspond to the number of experts that viewed the query via GUI 400. In some cases, the number of experts 604 that received the query can correspond to the number of experts that interacted with the GUI 400 by either selecting the accept button 410 or the decline button 412.

The data processing system 102 can present some or all of the responses. The data processing system 102 can provide the content or text of the response input via input text box 510. The data processing system 102 can present a portion of the response that can fit within a slot size of the response frame or UI element. The data processing system 102 can provide a preview of the response. For example, the data processing system 102 can present, via GUI 600, a first response 606, a second response 608, a third response 610, a fourth response 612, or a fifth response 614. The data processing system 102 can list the responses in any order or order the responses based on a policy, heuristic, or function. The data processing system 102 can rank or order the responses based on a timestamp or chronologically. For example, the data processing system 102 can list the responses in the order that they were received by the data processing system 102, with the first response 606 being the first response received by the data processing system 102, and the fifth response 614 being the last of the five responses received by the data processing system 102.

The data processing system 102 can rank or order the responses based on an attribute or characteristic of the profile of the expert or expert client device 126 that provided the response. For example, the data processing system 102 can rank responses from experts with a profile that more closely matches the query 422 higher than responses from experts with profiles that are less relevant. For example, a first response 606 from an expert with a profile with the same categories and location as query 422 may rank higher than a second response 608 from an expert with a profile that matches the same categories as the query 422 but has a different location than the query 422. The second response 608 from an expert with a profile that matches the same categories as the query 422 but has a different location than the query 422 can rank higher than a third response 610 from an expert that matches at least one category of the query 422 but does not match at least one other category of the query, for example.

In some cases, the data processing system 102 can rank the responses 606-614 based on a performance score or feedback score associated with the expert client devices 126. The data processing system 102 can leverage the model 116 or device selector 112 to rank or order the responses.

The user of client device 124 can select a response. The client device 124 can receive, via GUI 600, a selection of one or more of the responses 606-614. Upon reading the responses 606-614, or the preview of the responses, the user can select a response, such as the first response 606. Selecting the response can cause the application to navigate to GUI 700 to allow the client device 124 to establish a communication session with the expert client device 126 that provided the response.

Figure 7:
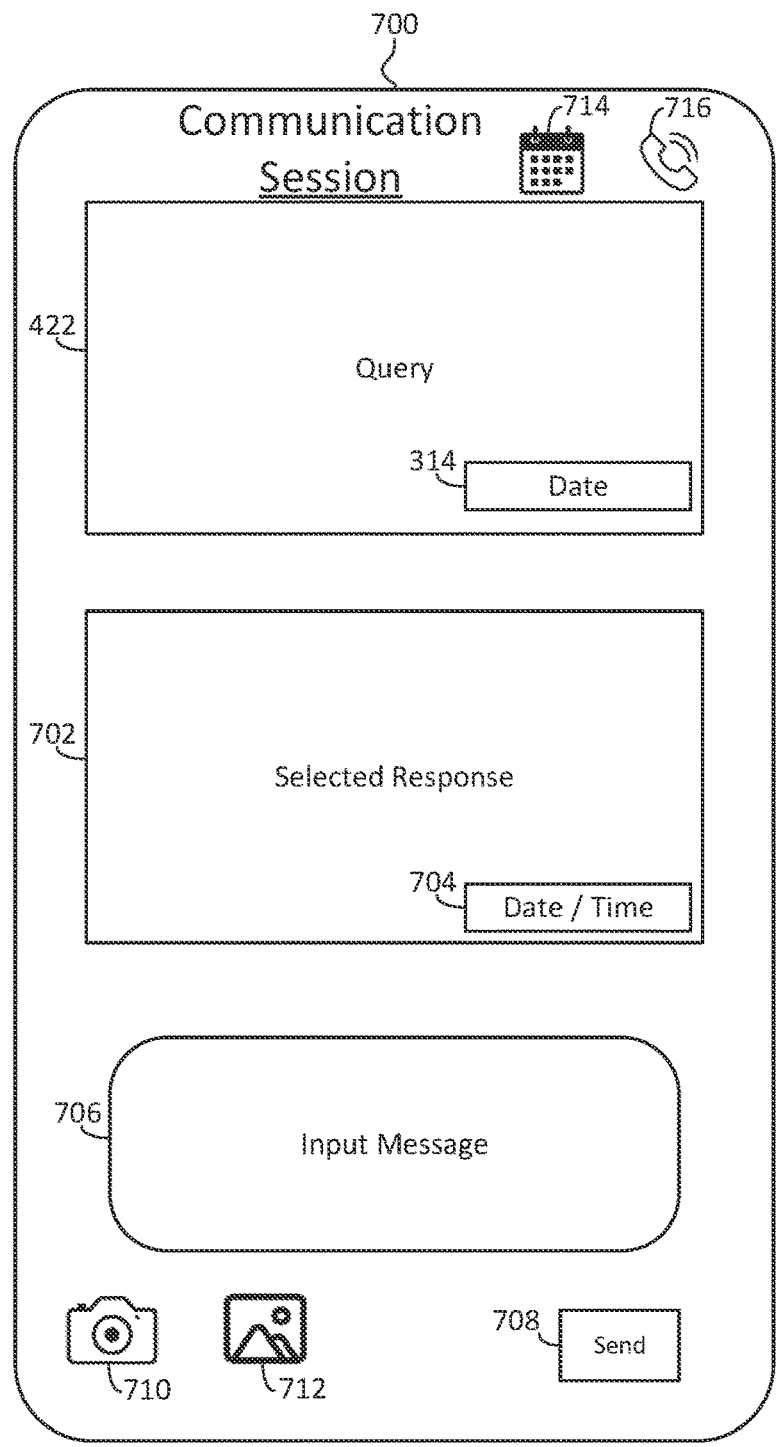
FIG. 7 is an illustration of a graphical user interface for a communication session.

FIG. 7 is an illustration of a graphical user interface for a communication session. The GUI 700 can be provided by one or more component or system depicted in FIG. 1, including, for example, client device 124 or data processing system 102. For example, the GUI 700 can be presented for display via client device 124 in communication with the data processing system 102 through the network 101. Through GUI 700, the user of client device 124 can establish a communication session with the expert client device 126 that provided the response triggered by the client device 124 via GUI 600.

The GUI 700 can present the query 422. The GUI 700 can present the selected response 702. The selected response 702 can be one of the responses 606-614. The selected response 702 can be the response that the user selected via GUI 600. The GUI 700 can present the text of content of the selected response 702. The GUI 700 can provide an indication of the date or time 704 the response was received by the data processing system 102 or transmitted by the expert client device 126.

The GUI 700 can include an input message 706 text box. The GUI 700 can include a camera icon 710 to activate a camera functionality of the client device 124. The GUI 700 can include a photo library icon 712 to invoke or access an image repository stored on or otherwise accessible to the client device 124. The user of client device 124 can input, via an input device 830, text or a message in the input message 706 text box. The user can take or capture an image by invoking the camera functionality of the client device 124 via the camera icon 710. The user can select an image via the photo library icon 712. The user can transmit the text or image by selecting the send button 708. The client device 124 can convert the text or image to data packets or a data file and transmit the data to data processing system 102 via network 101. The client device 124 can package the text along with the images for transmission to the data processing system 102. In some cases, the client device 124 can transmit the text or images to the expert client devices 126 without transmitting the text or images to the data processing system 102. For example, the client device 124 can bypass the data processing system 102 and transmit the text or images directly to the expert client device 126 via network 101.

The GUI 700 can include a calendar icon 714. Selecting the calendar icon 714 can launch a calendar application on the client device 124. The calendar application can be part of the application that provides GUI 700, or a different application that executes on the client device 124. The user of client device 124 can use the calendar application to schedule a meeting, phone call, video call, teleconference, or other event with the expert that provided the selected response 702. The calendar application can transmit a calendar event to the expert client device 126 having the expert identifier associated with the selected response 702.

The GUI 700 can include a call icon 716. Selecting the call icon 716 can launch a phone application on the client device 124. The phone application can be part of the application that provides GUI 700, or a different application that executes on client device 124. The user of client device 124 can use the phone application to make a phone call (or establish an audio or video communication session) with the expert client device 126 associated with the expert identifier associated with the expert that provided the selected response 702. For example, the selected response 702 can map to an expert identifier in records 114 that maps to a profile stored in records 114. The profile stored in records 114 can include a phone number, handle, username, or identifier to establish a communication session.

Figure 8:
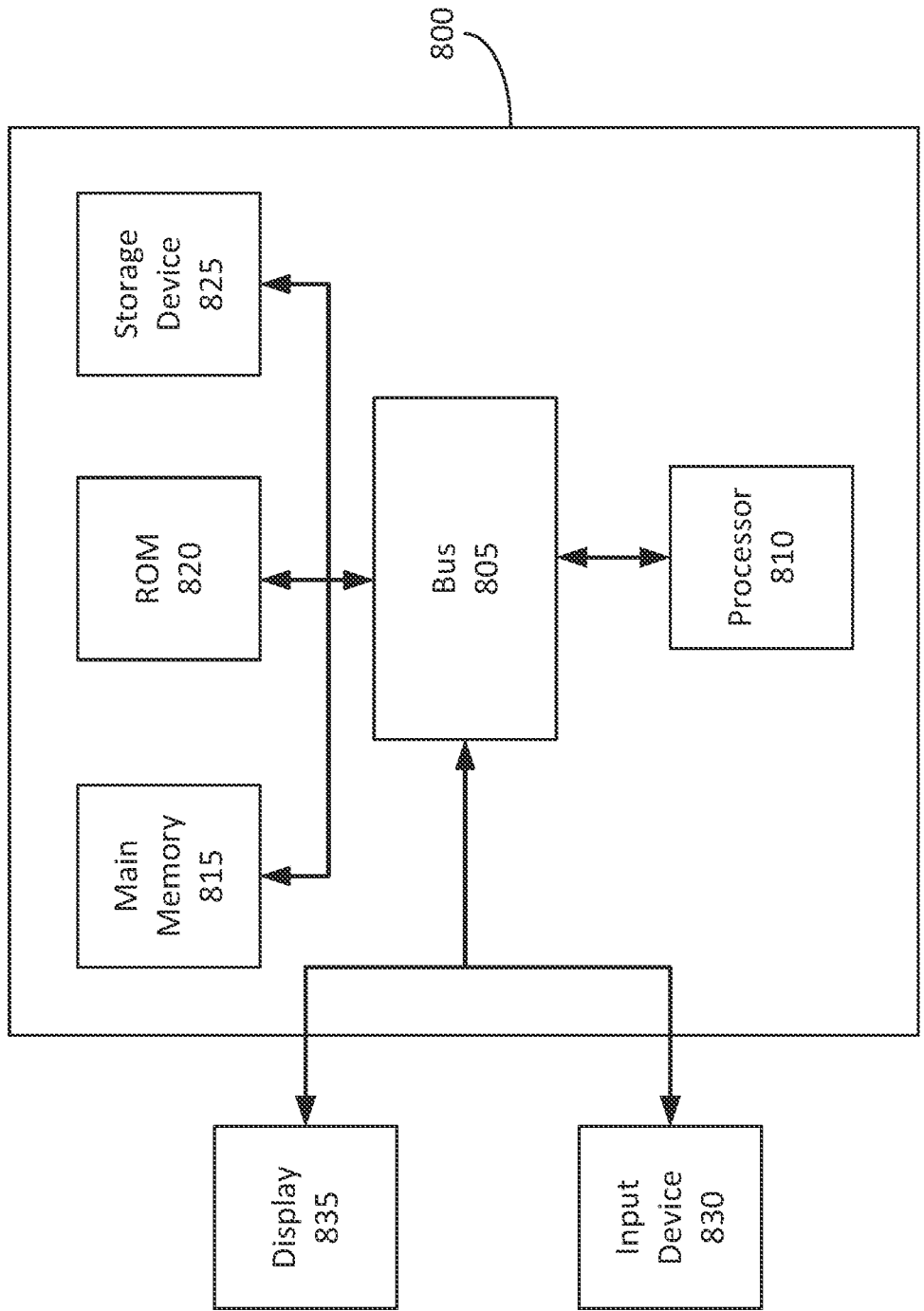
FIG. 8 is a block diagram illustrating an architecture for a computer system that can be employed to implement elements of the systems and methods described and illustrated herein, including, for example, the system depicted in FIG. 1 and the method depicted in FIG. 2.

FIG. 8 is a block diagram of an example computer system 800. The computer system or computing device 800 can include or be used to implement the system 100, or its components such as the data processing system 102. The computing system 800 can be used to implement the method 200. The computing system 800 can be used to implement one or more of the graphical user interfaces depicted in FIGS. 3-7. The computing system 800 includes a bus 805 or other communication component for communicating information and a processor 810 or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. The main memory 815 can be or include the data repository 130. The main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions. The storage device 825 can include or be part of the data repository 130.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information and command selections to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the data processing system 102, the client device 124 or other component of FIG. 1, for example.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, data collector 106, pre-processor 108, machine learning model generator 110, device selector 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 800 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client device 124, expert client device 126 or the remote data source 128).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the data collector 106 and pre-processor 108 can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to connect devices for communication sessions, comprising:
a data processing system comprising memory and one or more processors to:
receive, from a client device via a network, a first query comprising text;
determine, responsive to the first query and via a machine learning model trained with a plurality of expert records associated with a plurality of expert identifiers and labeled with a plurality of categories, a plurality of confidence scores corresponding to the plurality of expert identifiers;
select a first subset of expert identifiers from the plurality of expert identifiers based on a threshold confidence score or a ranking technique;
transmit a second query based on the first query to a plurality of client devices corresponding to the first subset of expert identifiers, the plurality of client devices different from the client device;
identify, based on one or more responses to the second query from one or more of the plurality of client devices, a second subset of expert identifiers from the first subset of expert identifiers;
provide, to the client device, an indication of the second subset of expert identifiers to cause the client device to establish a communication session with at least one client device of at least one of the second subset of expert identifiers; and
access a plurality of online digital forums via the network;
parse the plurality of online digital forums to generate training data; and
train the machine learning model with the training data obtained from the plurality of online digital forums.

2. The system of claim 1, comprising the data processing system to:
subsequent to the communication session, receive, from the client device, feedback corresponding to an expert identifier of the second subset of expert identifiers with which the communication session was established; and update the machine learning model based on the feedback to tune selection of a subsequent first subset of expert identifiers.

3. The system of claim 1, comprising the data processing system to:
apply a natural language processing technique to the first query received from the client device to remove one or more terms from the first query to increase at least one of the plurality of confidence scores output by the machine learning model.

4. The system of claim 1, comprising the data processing system to:
receive, from the client device, the first query comprising an image, video, or audio.

5. The system of claim 1, comprising the data processing system to:
receive, from the client device, an indication of a maximum number of expert identifiers; and
select, based on the ranking technique, the second subset of expert identifiers comprising a number of expert identifiers that is less than or equal to the maximum number of expert identifiers.

6. The system of claim 1, wherein the ranking technique comprises select a predetermined number of expert identifiers from the plurality of expert identifiers having a highest confidence score, comprising:
the data processing system to select the first subset of expert identifiers from the plurality of expert identifiers based on the ranking technique and satisfaction of the threshold confidence score.

7. The system of claim 1, comprising the data processing system to:
set a time limit for responding to the second query; and
identify the second subset of expert identifiers from the first subset of expert identifiers based on responses received from the second subset of expert identifiers satisfying the time limit.

8. The system of claim 1, comprising the data processing system to:
set a time limit for responding to the second query; and
determine not to connect to a third subset of expert identifiers based on responses to the second query from the third subset of expert identifiers being received upon expiration of the time limit.

9. The system of claim 1, comprising the data processing system to:
determine a response time for each of the one or more responses to the second query;
select a predetermined number of shortest response times based on the response time for each of the one or more responses; and
identify the second subset of expert identifiers corresponding to the predetermined number of shortest response times.

10. The system of claim 1, comprising the data processing system to:
establish the communication session between the client device and the at least one client device of the at least one of the second subset of expert identifiers, the communication session comprising at least one of a real-time audio-based communication or an asynchronous text-based communication.

11. The system of claim 1, comprising the data processing system to:
receive, subsequent to termination of the communication session between the client device and the at least one client device of the at least one of the second subset of expert identifiers, feedback from the client device indicative of a performance of the communication session; and
update the machine learning model based on the feedback to improve a performance of the machine learning model.

12. A method of connecting devices for communication sessions, comprising:
receiving, by a data processing system comprising one or more processors and memory, from a client device via a network, a first query comprising text;
determining, by the data processing system responsive to the first query and via a model constructed based on a plurality of expert records associated with a plurality of expert identifiers and labeled with a plurality of categories, a plurality of confidence scores corresponding to the plurality of expert identifiers;
selecting, by the data processing system, a first subset of expert identifiers from the plurality of expert identifiers based on a threshold confidence score or a ranking technique;
transmitting, by the data processing system, a second query based on the first query to a plurality of client devices corresponding to the first subset of expert identifiers, the plurality of client devices different from the client device;
identifying, by the data processing system, based on one or more responses to the second query from one or more of the plurality of client devices, a second subset of expert identifiers from the first subset of expert identifiers;
providing, by the data processing system to the client device, an indication of the second subset of expert identifiers to cause the client device to establish a communication session with at least one client device of at least one of the second subset of expert identifiers; and
applying, by the data processing system, a natural language processing technique to the first query received from the client device to remove one or more terms from the first query to increase at least one of the plurality of confidence scores output by the model.

13. The method of claim 12, comprising:
accessing, by the data processing system, a plurality of online digital forums via the network;
parsing, by the data processing system, the plurality of online digital forums to generate training data; and
training, by the data processing system, the model with the training data using machine learning obtained from the plurality of online digital forums.

14. The method of claim 12, comprising:
receiving, by the data processing system from the client device, the first query comprising an image, video, or audio.

15. The method of claim 12, comprising:
receiving, by the data processing system from the client device, an indication of a maximum number of expert identifiers; and
select, based on the ranking technique, the second subset of expert identifiers comprising a number of expert identifiers that is less than or equal to the maximum number of expert identifiers.

16. The method of claim 12, wherein the ranking technique comprises select a predetermined number of expert identifiers from the plurality of expert identifiers having a highest confidence score, comprising:

selecting, by the data processing system, the first subset of expert identifiers from the plurality of expert identifiers based on the ranking technique and satisfaction of the threshold confidence score.

17. The method of claim 12, comprising:
setting, by the data processing system, a time limit for responding to the second query; and
identifying, by the data processing system, the second subset of expert identifiers from the first subset of expert identifiers based on responses received from the second subset of expert identifiers satisfying the time limit.

18. The method of claim 12, comprising:
setting, by the data processing system, a time limit for responding to the second query; and
determining, by the data processing system, not to connect to a third subset of expert identifiers based on responses to the second query from the third subset of expert identifiers being received upon expiration of the time limit.

* * * * *